US009774922B2

(12) United States Patent
Wong et al.

(10) Patent No.: US 9,774,922 B2
(45) Date of Patent: Sep. 26, 2017

(54) METHOD AND APPARATUS FOR SYNCHRONIZING PAUSED PLAYBACK ACROSS PLATFORMS

(71) Applicant: HULU, LLC, Santa Monita, CA (US)

(72) Inventors: Robert M. Wong, Los Angeles, CA (US); Eden S. Li, Palo Alto, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 14/579,912

(22) Filed: Dec. 22, 2014

(65) Prior Publication Data

US 2015/0121440 A1    Apr. 30, 2015

Related U.S. Application Data

(63) Continuation of application No. 12/912,020, filed on Oct. 26, 2010, now Pat. No. 8,954,597.

(Continued)

(51) Int. Cl.
*G06F 15/16* (2006.01)
*H04N 21/6587* (2011.01)
(Continued)

(52) U.S. Cl.
CPC ....... *H04N 21/6587* (2013.01); *H04L 65/601* (2013.01); *H04N 21/41407* (2013.01);
(Continued)

(58) Field of Classification Search
CPC .... G06F 17/30; H04N 21/00; H04N 21/2387; H04N 21/47217
See application file for complete search history.

(56) References Cited

U.S. PATENT DOCUMENTS 6,281,940 B1    8/2001  Sciammarella
6,892,353 B1    5/2005  Ubillos
(Continued)

FOREIGN PATENT DOCUMENTS

EP    2023627    2/2009
GB    2457892    9/2009
(Continued)

OTHER PUBLICATIONS

International Search Report, PCT Application No. PCT/US2011/041774, mailed Nov. 3, 2011.
(Continued)

*Primary Examiner* — Esther B Henderson
(74) *Attorney, Agent, or Firm* — Fountainhead Law Group P.C.

(57) ABSTRACT

A media server receives a first request to transmit the media program to the first device and streams the media program to the first device. The method monitors the streaming of the media program to the first device to generate media program streaming information and transmits the media program streaming information to a media program provider. A second request is received to resume transmission of the media program from a second device where the request includes a temporal location within the media program that was received from the media program provider. The media program provider determined the temporal location from the streaming information transmitted from the media server to the media program provider. The media server resumes transmission of the media program to the second device from the temporal location received from the media program provider.

26 Claims, 11 Drawing Sheets

Related U.S. Application Data

(60) Provisional application No. 61/359,258, filed on Jun. 28, 2010.

(51) Int. Cl.
| | | |
|---|---|---|
| *H04N 21/414* | (2011.01) | |
| *H04N 21/43* | (2011.01) | |
| *H04N 21/4788* | (2011.01) | |
| *H04N 21/61* | (2011.01) | |
| *H04L 29/06* | (2006.01) | |
| *H04N 21/472* | (2011.01) | |

(52) U.S. Cl.
CPC ..... *H04N 21/4307* (2013.01); *H04N 21/4788* (2013.01); *H04N 21/47217* (2013.01); *H04N 21/6125* (2013.01)

(56) References Cited

U.S. PATENT DOCUMENTS

| | | | |
|---|---|---|---|
| 6,990,637 B2 | 1/2006 | Anthony et al. | |
| 7,165,219 B1 | 1/2007 | Peters et al. | |
| 7,197,557 B1* | 3/2007 | Asar | H04L 41/5009 |
| | | | 707/999.103 |
| 7,818,444 B2 | 10/2010 | Brueck et al. | |
| 7,823,056 B1 | 10/2010 | Davey et al. | |
| 2002/0133247 A1 | 9/2002 | Smith et al. | |
| 2005/0252959 A1* | 11/2005 | Gaumond | H04N 7/163 |
| | | | 235/375 |
| 2005/0278761 A1 | 12/2005 | Gonder et al. | |
| 2006/0033721 A1 | 2/2006 | Woolley et al. | |
| 2007/0021152 A1 | 1/2007 | Jung | |
| 2007/0083822 A1 | 4/2007 | Robbin et al. | |
| 2007/0136488 A1 | 6/2007 | Cho et al. | |
| 2007/0157241 A1 | 7/2007 | Walker | |
| 2007/0192193 A1 | 8/2007 | Haberman et al. | |
| 2008/0134043 A1 | 6/2008 | Georgis et al. | |
| 2008/0155590 A1 | 6/2008 | Soukup et al. | |
| 2008/0238708 A1 | 10/2008 | Pittard et al. | |
| 2009/0094634 A1 | 4/2009 | Haberman et al. | |
| 2009/0106082 A1 | 4/2009 | Senti et al. | |
| 2009/0150941 A1 | 6/2009 | Riedl et al. | |
| 2009/0164944 A1 | 6/2009 | Webster et al. | |
| 2009/0185619 A1 | 7/2009 | Taleb et al. | |
| 2009/0287841 A1 | 11/2009 | Chapweske et al. | |
| 2010/0030644 A1 | 2/2010 | Dhamodharan | |
| 2010/0057928 A1 | 3/2010 | Kapoor et al. | |
| 2010/0077095 A1 | 3/2010 | Wong et al. | |
| 2010/0106852 A1 | 4/2010 | Kindig et al. | |
| 2010/0107126 A1 | 4/2010 | Lin et al. | |
| 2010/0121891 A1* | 5/2010 | Zampiello | G06F 17/30053 |
| | | | 707/822 |
| 2010/0131993 A1 | 5/2010 | Sanitate et al. | |
| 2011/0072105 A1 | 3/2011 | Biderman et al. | |
| 2011/0082915 A1* | 4/2011 | Carr | H04N 21/25891 |
| | | | 709/219 |
| 2011/0087553 A1 | 4/2011 | Mishra et al. | |
| 2011/0131607 A1* | 6/2011 | Thomas | G06F 3/0481 |
| | | | 725/40 |
| 2011/0145726 A1 | 6/2011 | Wei et al. | |
| 2011/0246661 A1 | 10/2011 | Manzari et al. | |
| 2011/0320287 A1 | 12/2011 | Holt et al. | |
| 2011/0320626 A1 | 12/2011 | Wong et al. | |
| 2011/0320945 A1 | 12/2011 | Wong et al. | |
| 2012/0047166 A1* | 2/2012 | Katz | H04N 7/17318 |
| | | | 707/769 |
| 2013/0166765 A1 | 6/2013 | Kaufman | |
| 2014/0310757 A1* | 10/2014 | Ho | H04N 21/2387 |
| | | | 725/88 |

FOREIGN PATENT DOCUMENTS

| | | |
|---|---|---|
| JP | 2001-359073 A | 12/2001 |
| JP | 2003-242074 A | 8/2003 |
| JP | 2004-064330 A | 2/2004 |
| JP | 2004-356867 A | 12/2004 |
| JP | 2005-295467 A | 10/2005 |
| JP | 2006-501711 A | 1/2006 |
| JP | 2008-306600 A | 12/2008 |
| JP | 2009-522850 A | 6/2009 |
| JP | 2010-109791 A | 5/2010 |
| WO | 2005029770 | 3/2005 |
| WO | 2008/007677 A1 | 1/2008 |
| WO | 2008-121639 A1 | 10/2008 |
| WO | 2010-058549 A1 | 5/2010 |
| WO | 2010-078281 A2 | 7/2010 |

OTHER PUBLICATIONS

International Search Report, PCT Application No. PCT/US2011/041898, mailed Oct. 28, 2011.

International Search Report, PCT Application No. PCT/US2011/041778, mailed Oct. 26, 2011.

European Search Report, mailed May 9, 2014, from a corresponding EP Application, No. 11807256.0, 7 pages.

Extended European Search Report, mailed Aug. 7, 2015, from a corresponding foreign application), EP 11807255.2.

\* cited by examiner

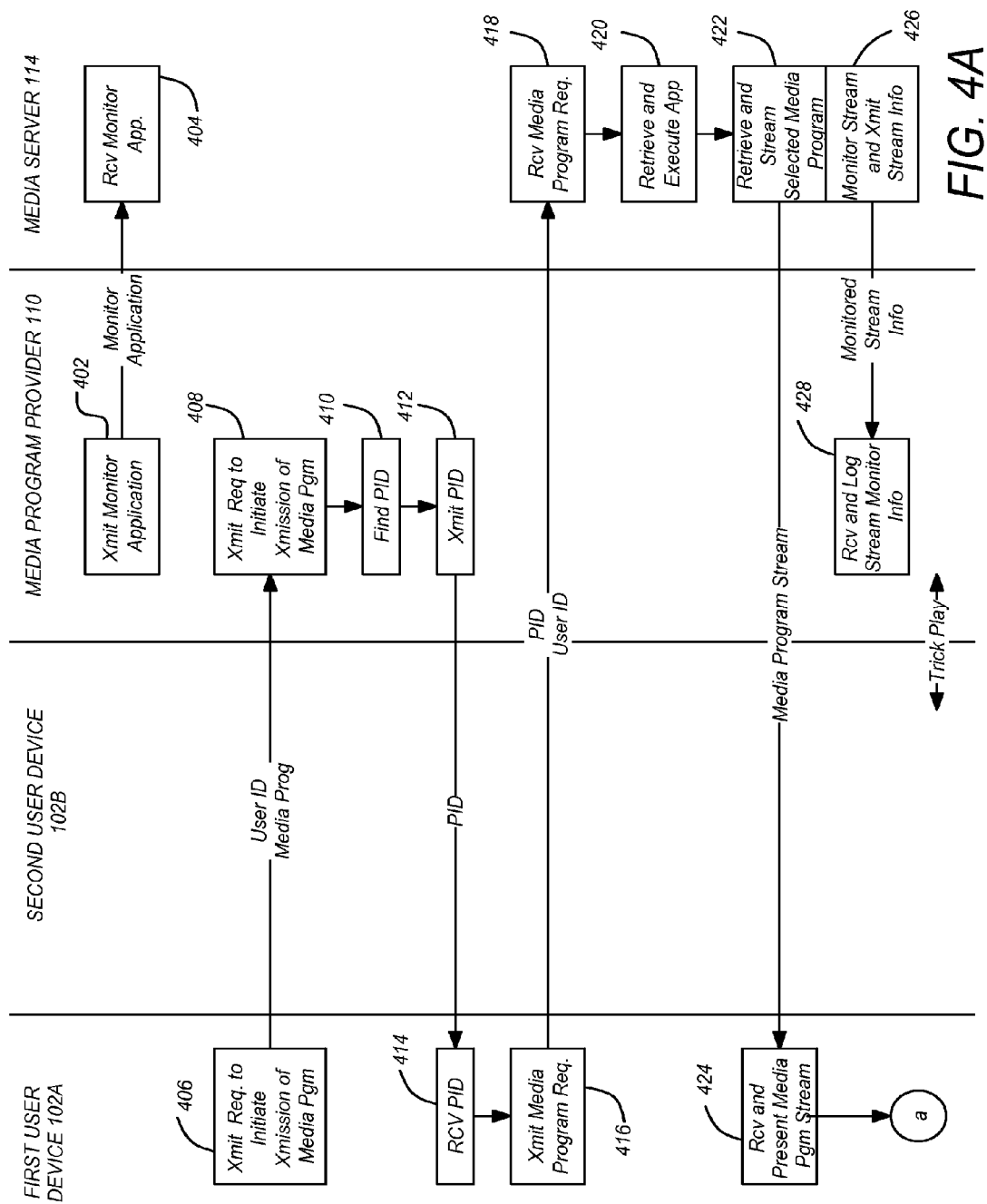

```
#EXTM3U
#EXT-X-VERSION:2
#EXT-X-TARGETDURATION:14
#EXT-X-MEDIA-SEQUENCE:9
#EXT-X-ALLOW-CACHE:NO
#EXTINF:4,
http://assets.huluim.com/prerolls/np/abc-preroll-480k_1000/segment0.ts
#EXT-X-DISCONTINUITY
#EXTINF:10,
https://hulus-a.akamaihd.net/hulu12/11/50000011/agave50000011_586724_samourai.tar/segment0.ts?authToken=1275...a744c
#EXTINF:10,
https://hulus-a.akamaihd.net/hulu12/11/50000011/agave50000011_586724_samourai.tar/segment1.ts?authToken=1275...7ea20
#EXTINF:11,
https://hulus-a.akamaihd.net/hulu12/11/50000011/agave50000011_586724_samourai.tar/segment2.ts?authToken=1279...2e
```

FIG. 6

```
#EXTM3U
#EXT-X-VERSION:2
#EXT-X-TARGETDURATION:14
#EXT-X-MEDIA-SEQUENCE:0
#EXT-X-ALLOW-CACHE:NO
#EXTINF:4,
http://assets.huluim.com/preclis/np/abc-preroll-480k_i00/segment0.ts
#EXT-X-DISCONTINUITY
#EXTINF:10,
https://hulus-a.akamaihd.net/huiu12/i1/50000011/agave50000011_586724_samourai.tar/segment0.ts?authToken=1275...a744c
#EXTINF:10,
https://hulus-a.akamaihd.net/huiu12/i1/50000011/agave50000011_586724_samourai.tar/segment1.ts?authToken=1275...7ea20
#EXTINF:11,
https://hulus-a.akamaihd.net/huiu12/i1/50000011/agave50000011_586724_samourai.tar/segment2.ts?authToken=1279...2e
#EXT-X-KEY:METHOD=AES-128,URI="https://hulus-a.akamaihd.net/huiu12/i1/USERID=A2301AF/50000011/agave50000011_586724_samourai.tar/segment3.ts?authToken=1275...a13
#EXTINF:10,
https://hulus-a.akamaihd.net/huiu12/i1/50000011/agave50000011_586724_samourai.tar/segment4.ts?authToken=1275...a744c
#EXTINF:10,
https://hulus-a.akamaihd.net/huiu12/i1/50000011/agave50000011_586724_samourai.tar/segment5.ts?authToken=1275...7ea20
#EXTINF:11,
https://hulus-a.akamaihd.net/huiu12/i1/50000011/agave50000011_586724_samourai.tar/segment6.ts?authToken=1279...2c
#EXT-X-DISCONTINUITY
#EXT-X-KEY:METHOD=AES-128,URI="https://hulus-a.akamaihd.net/huiu12/i1/50000011/agave50000011_586724_samourai.tar/segment3.ts?authToken=1275...a13
#EXTINF:10,
https://hulus-a.akamaihd.net/huiu12/i1/50000011/agave50000011_586724_samourai.tar/segment4.ts?authToken=1275...a744c
#EXTINF:10,
https://hulus-a.akamaihd.net/huiu12/i1/50000011/agave50000011_586724_samourai.tar/segment5.ts?authToken=1275...7ea20
#EXTINF:11,
https://hulus-a.akamaihd.net/huiu12/i1/50000011/agave50000011_586724_samourai.tar/segment6.ts?authToken=1279...2c
```

FIG. 8

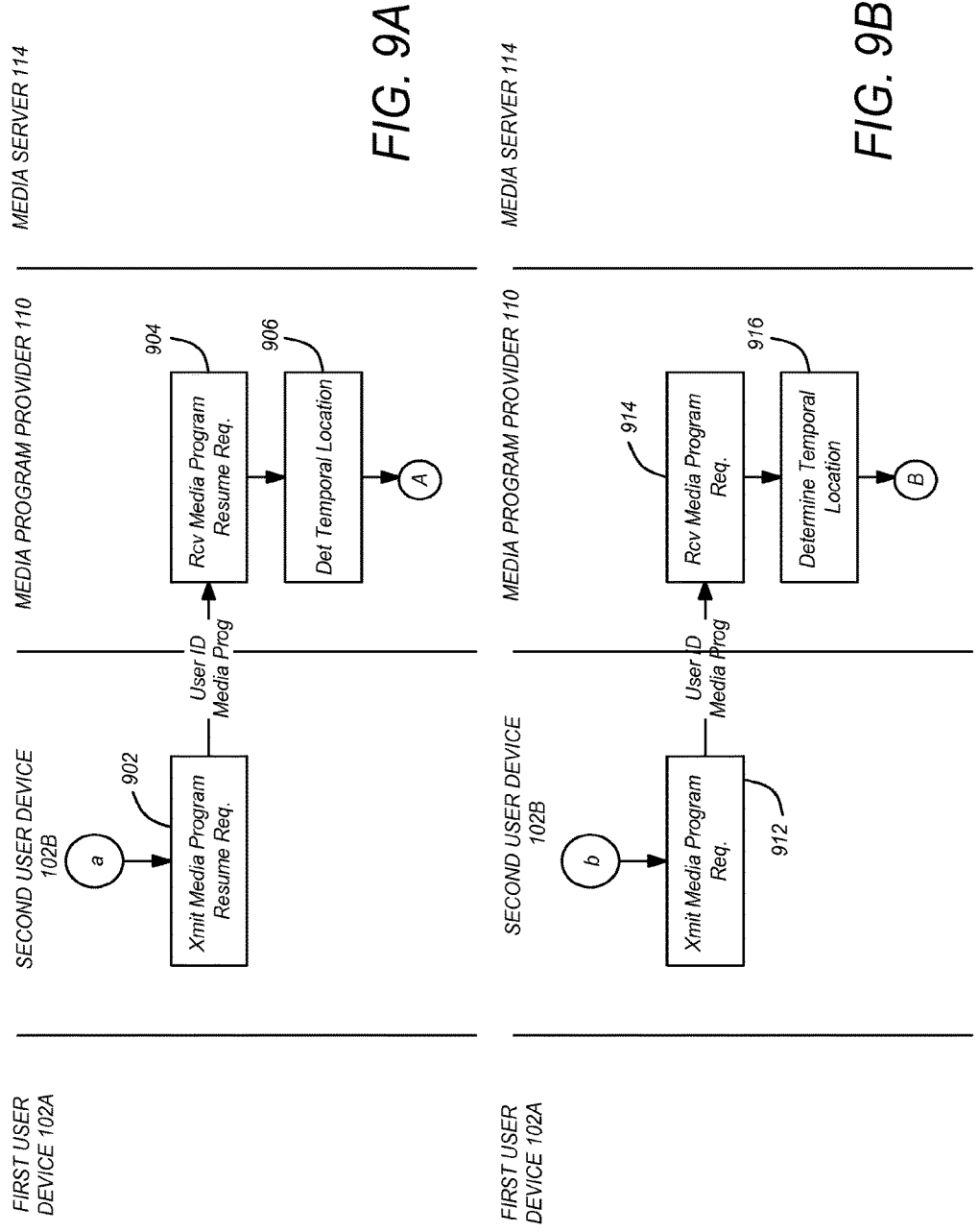

METHOD AND APPARATUS FOR SYNCHRONIZING PAUSED PLAYBACK ACROSS PLATFORMS

CROSS REFERENCE TO RELATED APPLICATIONS

This application is a continuation of U.S. patent application Ser. No. 12/912,020, entitled "METHOD AND APPARATUS FOR SYNCHRONIZING PAUSED PLAYBACK ACROSS PLATFORMS," filed Oct. 26, 2010, which claims the benefit of U.S. Provisional Patent Application No. 61/359,258, entitled "METHOD AND APPARATUS FOR SYNCHRONIZING PAUSED PLAYBACK ACROSS PLATFORMS," filed Jun. 28, 2010 by Robert M. Wong and Eden S. Li, all of which are hereby incorporated by reference herein.

This application is related to the following patent application(s), all of which applications are incorporated by reference herein:

U.S. Provisional Patent Application No. 61/359,319, entitled "METHOD AND APPARATUS FOR PROVIDING STREAMING MEDIA PROGRAMS AND TARGETED ADVERTISEMENTS COMPATIBLY WITH HTTP LIVE STREAMING," filed Jun. 28, 2010 by William Z. Holt, Xinan (NMI) Wu, Eden S. Li, Alexander V. Gutarin and Baptiste Coudurier; and Application Ser. No. 12/896,803, entitled "METHOD AND APPARATUS FOR INTUITIVE NAVIGATION OF A MEDIA PROGRAM," filed on Oct. 1, 2010, by Robert M. Wong, Charles B. Reeves and Eugene Chan-Huai Wei, which application claims benefit to U.S. Provisional Patent Application No. 61/359,309, entitled "METHOD AND APPARATUS FOR INTUITIVE NAVIGATION OF A MEDIA PROGRAM," filed Jun. 28, 2010 by Robert M. Wong, Charles B. Reeves and Eugene Chan-Huai Wei.

BACKGROUND OF THE INVENTION

1. Field of the Invention

The present invention relates to systems and methods for providing streamed media programs and in particular, to a method and apparatus for pausing playback on a first device and resuming playback on a second device.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and/or satellite). These methods of dissemination and playback have become competitive with traditional means. Dissemination of media programs via the Internet may occur either by simple downloading, progressive downloading or streaming.

Progressive Downloading

For progressive download, a media file having the media program is downloaded via the Internet using dial-up, DSL, ADSL, cable, T1, or other high speed connection. Such downloading is typically performed by a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user will have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user computer at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

Mobile Devices

There is a desire to transmit media programs to mobile media program playback devices such as cellphones, IPHONES, PDAs, laptop computers, and the like. Transmission of media programs to mobile devices offers additional challenges, as the bandwidth of the communication channel is typically reduced, and the processing power of the device itself is typically less than that of an ordinary computer or special purpose device.

Transmission protocols have been developed to transmit media programs to such devices, including live media programs, the transmission of live media programs can be even more challenging as the length of such streams is unbounded. One such transmission protocol is the HTTP live streaming protocol of the IETF (Internet Engineering Task Force) Trust available at http://tools.ietf.org/html/draft-pantos-http-live-streaming-04 and provided in the Appendix attached hereto.

Synchronizing Playback

Mobile media program playback devices allow the user to receive and view media programs almost anywhere. However, in many circumstances, users do not wish to view an entire media program on a mobile device. For example, the user may begin watching a media program on a first device such as a television or a computer, but may wish to watch the remainder of the media program on a second device such as another computer in the home, or a mobile device. Similarly, a user may begin watching a media program using a mobile device, and once they arrive home, wish to view the remainder of the media program on a home computer or television. While it is possible for the user to simply start viewing the media program from the beginning on the second device and use trick play operations to fast-forward to the same temporal position in the media program, this solution is not only inconvenient, it also may force the viewer to watch advertisements that they have already seen when they were using the first device.

Accordingly, the Applicants have recognized that there is a need in the art for a method and apparatus that allows for the interruption of the streaming of a media program on one device, and resumption of the same media program from the same (interrupted) temporal location on a second device. The present invention satisfies that need.

SUMMARY OF THE INVENTION

To address the requirements described above, a method, apparatus, article of manufacture, and a memory structure for resuming playback of a media program is provided where the playback is initiated by a first device and resumed on a second device. A media server receives a first request to transmit the media program to the first device and streams the media program to the first device. The method monitors the streaming of the media program to the first device to generate media program streaming information and transmits the media program streaming information to a media program provider. A second request is received to resume transmission of the media program from a second device where the request includes a temporal location within the media program that was received from the media program provider. The media program provider determined the temporal location from the streaming information transmitted from the media server to the media program provider. The media server resumes transmission of the media program to the second device from the temporal location received from the media program provider.

BRIEF DESCRIPTION OF THE DRAWINGS

Referring now to the drawings in which like reference numbers represent corresponding parts throughout:

FIGS. 4A and 4B are diagrams illustrating an exemplary process for synchronizing a first user device and a second user device;

FIG. 6 is a diagram of an exemplary segment playlist;

FIG. 8 is a diagram showing an exemplary playlist;

FIG. 9A is a diagram illustrating exemplary process steps that would allow a media program being played by a user device operating under the segmented protocol shown in FIG. 5 to be resumed by a user device operating under the streaming protocol illustrated in FIG. 3; and FIG. 9B is a diagram illustrating exemplary process steps that would allow a media program being played by a user device operating under the streaming protocol shown in FIG. 3 to be resumed by a user device operating under the segmented protocol illustrated in FIG. 5.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
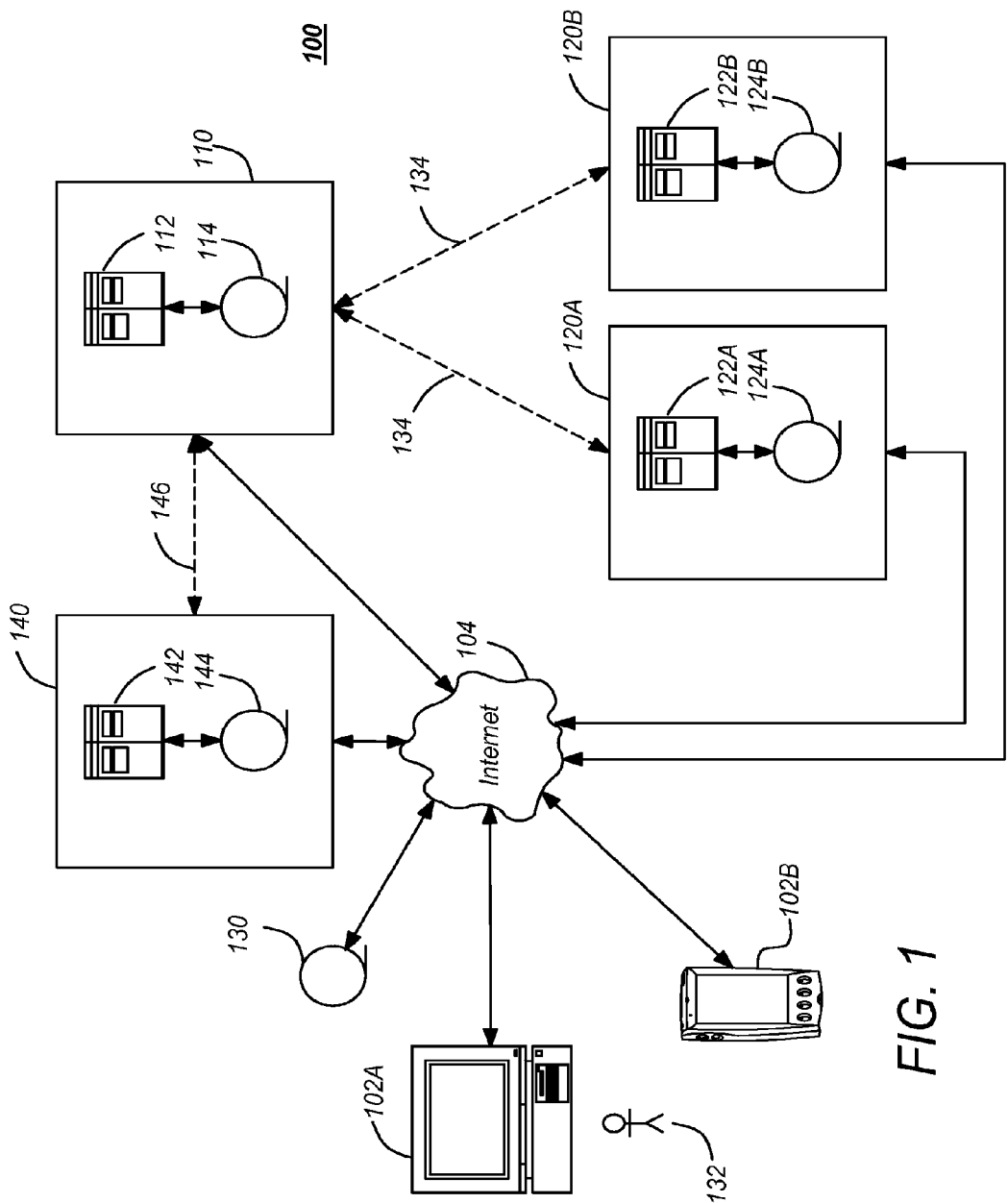
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 transmits media programs to a first user device 102A such as a computer or a second user device 102B such as a cellphone (hereinafter alternatively referred to as user device(s) 120). This transmission may be direct from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user device 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the user devices 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user device(s) 102 at the appropriate time.

In one embodiment, the advertisements are integrated with the streamed or downloaded video from the media program provider 110. In another embodiment, the advertisements are not integrated with the media program, but are instead transmitted to the user devices 102 separately from the media program, and replayed at the appropriate time using indices that indicate when each advertisement should be presented. For example, advertisements can be indexed and streamed or downloaded to the user devices 102 (from the media program provider 110 or the advertisement provider 140), and such advertisements can be played back to the user 132 at times indicated by corresponding indices in the media program.

Figure 2:
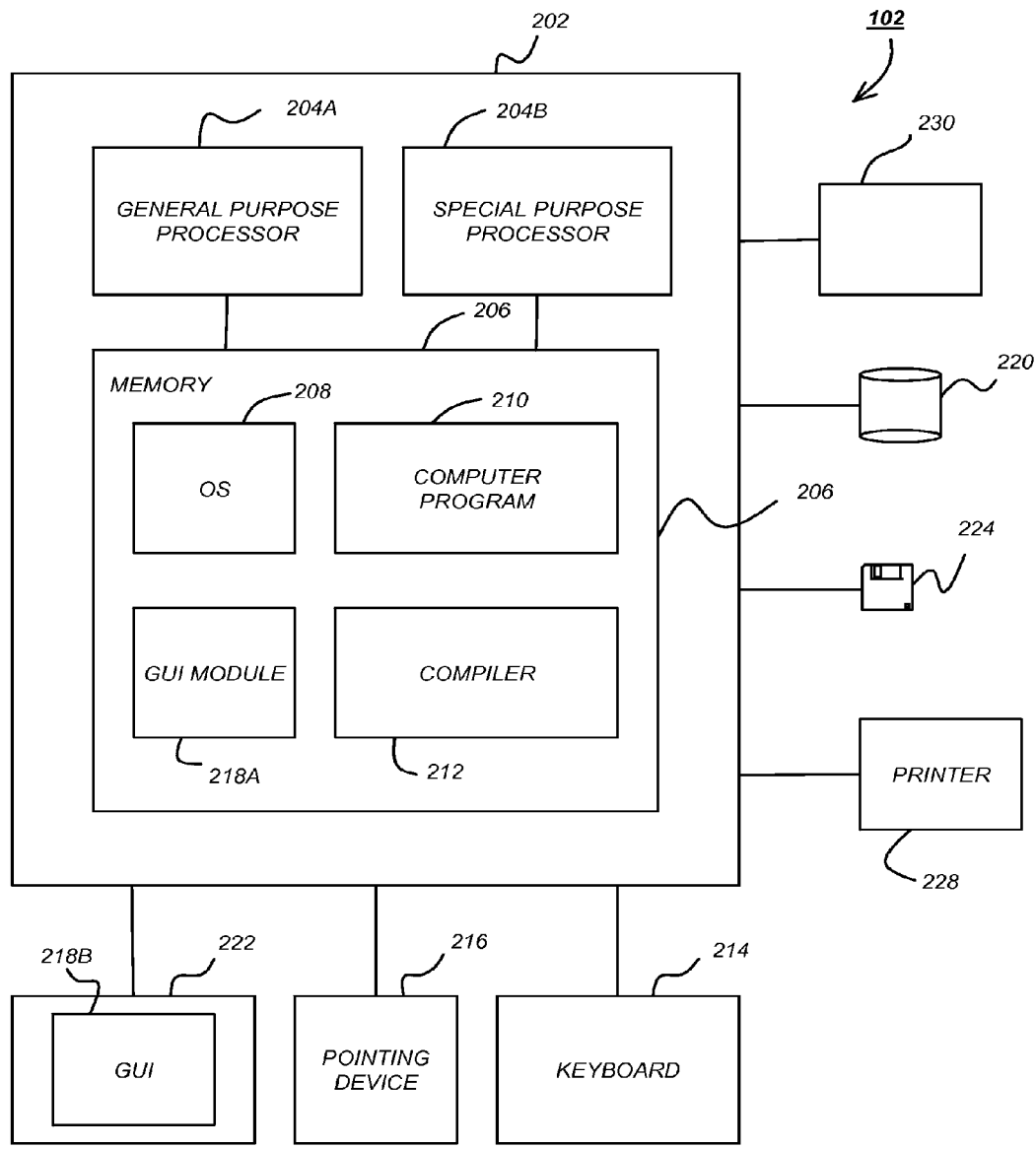
FIG. 2 illustrates an exemplary computer system that could be used to implement the present invention.

FIG. 2 illustrates an exemplary computer system 202 that could be used to implement elements of the present invention, including the user devices 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, some or all of the computer program 210 instructions may be implemented via firmware instructions stored in a read only memory (ROM), a programmable read only memory (PROM) or flash memory in within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" is referred to herein, it is understood that a user computer 102 may include portable devices such as cellphones, portable MP3 players, video game consoles, notebook computers, pocket computers, personal data assistants (PDAs) or any other device with suitable processing, communication, and input/output capability.

Figure 3:
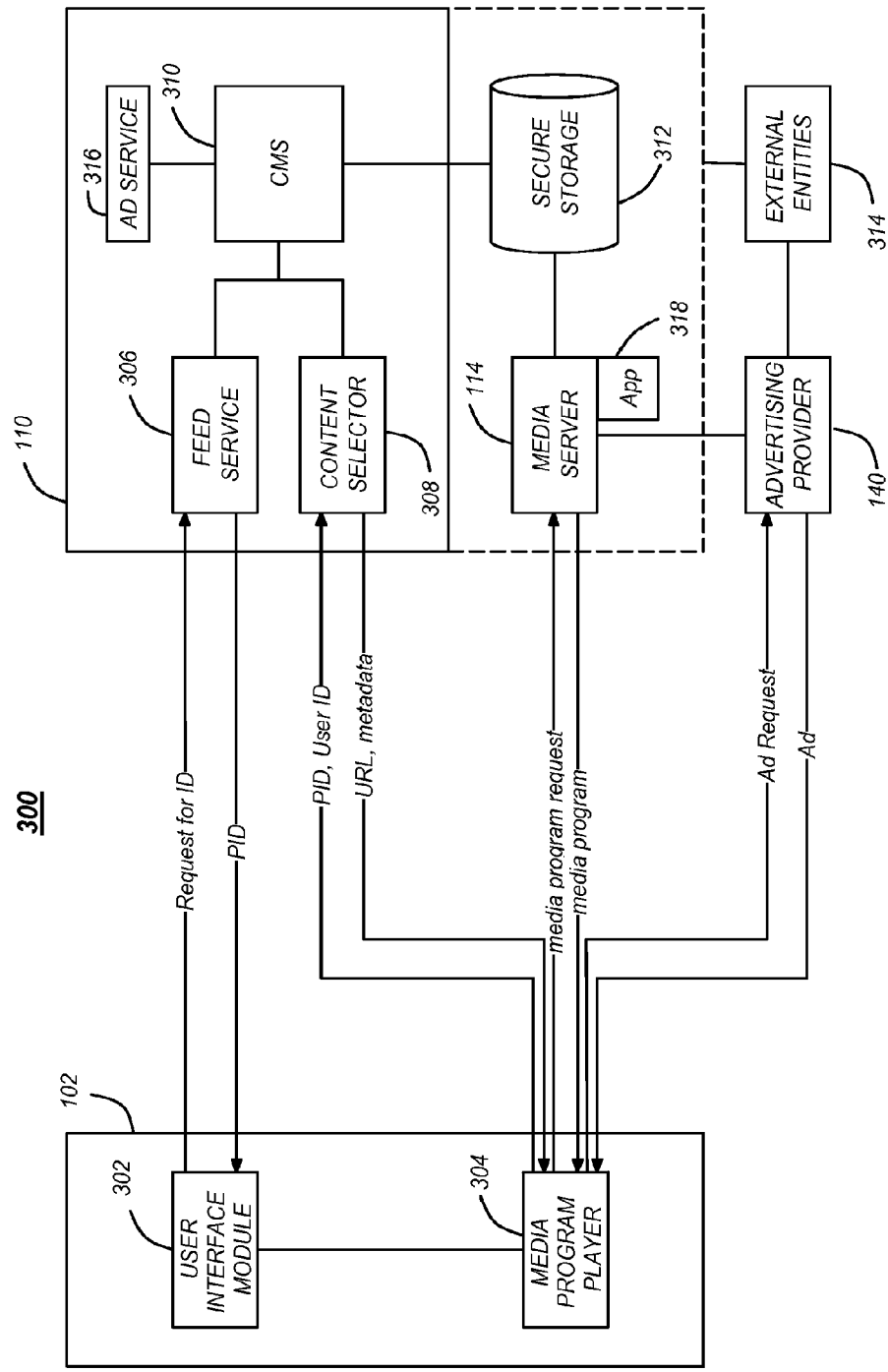
FIG. 3 is a diagram illustrating a content delivery subsystem and top-level operations that can be used to deliver media programs and advertisements for presentation to a user.

FIG. 3 is a diagram illustrating a first embodiment of a content delivery subsystem (CDS) 300 and top-level operations that can be used to deliver media programs and advertisements for presentation to the user 132. In the illustrated embodiment, the content delivery subsystem 300 includes the user device 102, a media program provider 110, and an advertisement provider 140.

In the illustrated embodiment, the media program provider 110 comprises a feed service 306, a content selector 308 and a content management service 310. When the user 132 selects a media program using the user device 102, a message is transmitted from the user device 102 to the media program provider 110 requesting the media program identifier (PID) of the selected media program. The feed service 306 recites the request, and using information obtained from secure storage 312 via the content management service 310, the feed service 306 determines the PID for the selected media program and transmits the PID to the user device 102. The user device transmits this PID and a user ID to the content selector 308 of the media program provider 110. The content selector 308 forwards the information to the content management service 310, which uses the advertisement service 318 to select advertisements appropriate for the user and selected media program, using information stored in secure storage 312. This may be accomplished as described in co-pending patent application Ser. No. 12/787,679, entitled "METHOD AND APPARATUS FOR RAPID AND SCALEABLE DIRECTED ADVERTISING SERVICE," by Wing Chit Mak, filed May 26, 2010, which application is hereby incorporated by reference herein. The content management service 310 forwards this information to the content selector 318, which transmits information from which the user device 102 may obtain the selected media program from the media server 114, as well as advertisements from the advertising provider 140. In the illustrated embodiment, this information includes the address (e.g. URL) where the desired media program can be obtained from the media server 114. The user device 102 transmits a media program request to the media server 1114 at a specified address. The media server 114 retrieves the media program from secure storage, and transmits the media program to the user device 102. The user device 102 may also request advertisements from the advertising provider 120 and receive them as well.

Although the advertisement provider 140 and media server 114 is illustrated as a separate architectural entity than the media program provider 110, the advertisement provider 140 may be integrated with the media program provider 110 (that is, the media program provider may also provide the advertisements). The CDS 300 provides a means to provide media programs and advertisements across a plurality of distribution networks, which may include www.hulu.com, www.imdb.com, www.aol.com or www.msn.com.

Metadata related to media program and advertisement content as well as streaming information is stored in the content delivery system 300 in database 312, as is data describing where the media programs and advertisements may be found within the CDS 300.

The user device 102 may include an interface module 302 and a media program player 304. The interface module 302 includes instructions performed by the user device 102 that are used to present information and media programs to the user 132 and to accept user input, including commands. Exemplary user devices 102 are a desktop computer, a laptop computer, or a portable device such as an IPOD, IPHONE, IPAD, a portable telephone, or a PALM device.

Figure 4B:
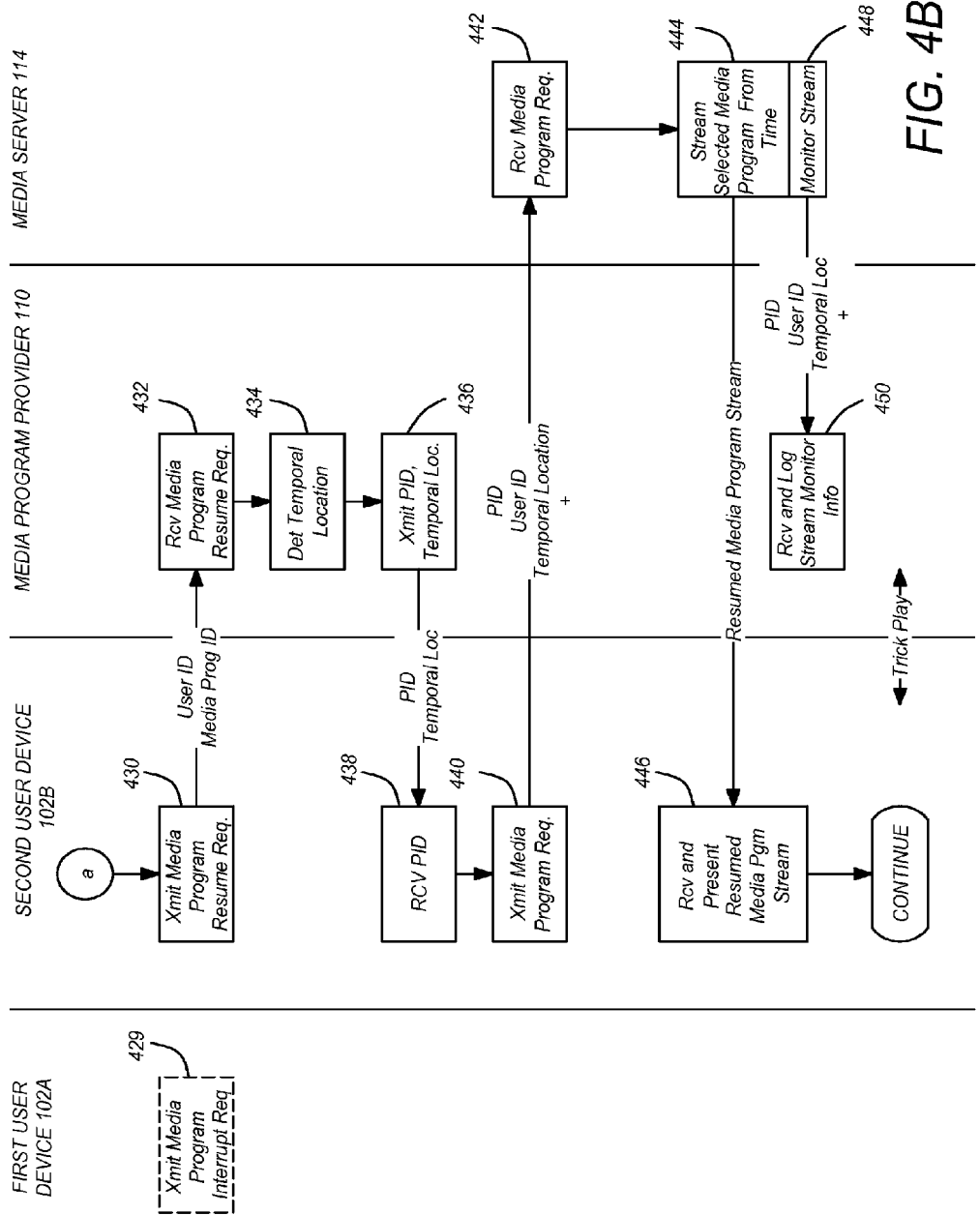

FIGS. 4A and 4B are diagrams illustrating an exemplary process for synchronizing a first user device 102A and a second user device 102B. In this embodiment, the media server 114 may comprise a flash server. In block 402, the media program provider 110 transmits a monitoring application 318 to the media server 114. The monitoring application is later executed by the media server 114, allowing transmissions to the user devices 102 to be monitored. The media server 114 receives the monitoring application 318, and stores the monitoring application 318 for later retrieval and execution as described below. The first user device 102A transmits a request to the media program provider 110 to initiate the transmission of the media program to the first user device 102A, as shown in block 406. In one embodiment, the request includes an indication of the media program (for example a code related to the media program or the name of the media program) and a user ID identifying the user 132 or a user device ID to serve as a proxy for the user ID.

The media program provider 110 receives the request, and finds the PID of the media program that was requested, and transmits the PID (and optionally, other information such as described above) to the first user device, as shown in blocks 408-412. The first user device 102A receives the PID and transmits a media program request having the PID and a user ID to the media server 114, as shown in blocks 414-416. Alternatively, the media program request may be simply a request addressed to a URL (obtained, for example, from the content selector 308 in response to a request from the first user device 102A) at which the media program may be obtained from the media program. The media server 114 receives the media program request, and retrieves and executes the stream monitoring application 318 it received in block 404, as shown in blocks 418 and 420. The media server 114 then retrieves the media program associated with the PID and transmits the media program to the first user device 102A where it is received and presented to the user, as shown in blocks 422 and 424. In one embodiment, the media program is streamed to the first user device 102A.

Using the stream monitoring application 318, the media server monitors the transmission of the stream and/or commands received from the first user device 102A and transmits this monitored information to the media program provider 110, as shown in block 426. The monitored information is received and logged or stored, as shown in block 428.

The monitored information may be compiled and periodically transmitted, compiled and transmitted when events of interest (for example, trick play operations) occur, or continuously transmitted to the media program provider 110 from the media server 114. In one embodiment, the monitored information provides information about the playback state of the first user device, including the current temporal position of the media program streamed to the first user device, the resolution of the stream (since the media program device may be receiving steams of different resolution), and other data. Although the media server 114 may be uncertain as to the temporal playback location at any given time, the playback location can be reasonably inferred from the monitored stream. For example, if the media server 114 receives a request from the first user device 102A to play the media program at a point 24 minutes from the beginning of the media program (for example, by moving a cursor on a progress bar), this event can be detected by the monitoring application. If a request to no further requests is received from the first user device in the next 10 minutes, it is reasonable to assume that the playback position of the first user device is now 24+10=34 minutes after the beginning of the media program. If a pause or interrupt command was received, and then no further input, it is reasonable to assume that the playback position has not changed from where it was paused.

Turning to FIG. 4B, a second user device 102B transmits a request to resume transmission of the media program to the second user device 102B, as shown in block 430. The request is transmitted from the second device 102B and received in the media program provider 110. Before the transmission of this request, the transmission of the media program to the first user device 102A or the reception of the media program may have been paused or stopped, or the media program player application in the first user device may have terminated. This could occur intentionally (e.g. by virtue of a pause or stop command) or unintentionally (due to a malfunction of the first user device 102A or its software, or drop in communication connectivity between the first user device and the media server 114, for example, through a drop in wireless coverage).

The request to resume transmission of the media program to the second user device 102B may be an explicit request to resume the transmission from the point where playback was interrupted, or may simply be a request for the media program identical to the request described in block 406, with the recipient of the request recognizing that the media program request is was received under circumstances indicating that reception of the media program by the first user device was terminated or paused. For example, in one embodiment, when the user wants to transfer the reception of the media program from the first user device 102A to the second user device 102B, the user may provide a special command for that purpose as shown in block 429, thus informing the media program provider 110 or the media server 114 (which can forward the information to the media program provider 110 via the stream monitoring application 318) that transmission to the first user device 102A should cease and that transmission to the second user device 102B should commence from the temporal location in the media program where reception ceased. Or, in another embodiment, if the user has not provided a special command (or if no command is provided), the media program provider can infer that reception of the media program by the first user device 102A has terminated or is no longer desired by virtue of a request to view the same media program from the same user from the second user device 102B.

The request to resume playback of the media program is received by the media program provider 110, as shown in block 432. Using the monitored information received and logged or stored from the monitoring application 318 executing on the media server 114, the media program provider 110 determines the state of the playback of the media program when transmission was terminated or interrupted. This may include, for example, the temporal location within the media program, as shown in block 434.

Since the currently played temporal position of the media program by the first user device may be earlier in the program than the currently streamed temporal position of the media program (by virtue of buffering of the transmitted media program by the first user device 120A), the media program provider 110 may take other factors into account when generating the temporal location within the media program from which to resume transmission. For example, the media program provider 110 can use such information as the buffer size of the first user device 120A, the transmission channel bandwidth between the media server 114 and the first user device 120A, or other factors in determining the temporal location from which the media program will be resumed. The media program provider 110 may also use monitoring information that includes the status of the media program player implemented by the first user device 102, or may simply select the temporal location before the computed temporal location by an amount that assures that playback of the media program will resume no later than where playback was interrupted or terminated. In other embodiments, computed temporal location can be determined using media program metadata (e.g. so that play is resumed at the beginning of a scene). Further, if the computed temporal location precedes an advertisement that has already been played to the user, the advertisement may be skipped when the program is replayed on the second device.

The media program provider 110 then transmits the temporal location and the PID (if necessary) to the second user device, where it is received, as shown in blocks 436 and 438. The second user device 120B transmits the PID, user ID and temporal location to the media server, 114 where it is received as shown in blocks 440 and 442. The media server 114 then transmits the selected media program to the second user device 102B beginning at the generated temporal location, as shown in block 444 and 448. As before, the media server 114 monitors the transmission and sends the monitored information to the media program provider 110, so that if transmission is diverted back to the first user device 102A or to a third user device, play may be resumed from the location from where it was interrupted, pause, or terminated.

In other embodiments, the operations shown in blocks 436-442 are omitted. In this embodiment, when a request to resume transmission of the media program is received, the temporal playback position is estimated or determined, and the media program is streamed from that point without transmitting the temporal location to the second user device and receiving the request transmitted in block 440. This embodiment is especially useful in embodiments wherein the media server 114 is controlled or deployed with the media program provider 110.

In FIGS. 4A and 4B, the media program was streamed to the user device 102A by a process where a PID was identified, sent to the first user device, and transmitted from the user device 102A to the media server 114 to retrieve the media program stream. Other embodiments are possible, for example, the embodiment of FIG. 3, in which the PID is used to retrieve the URL of the media server 114, and the user device 102A transmits the media program request to the media server 114 at this address. Other embodiments also possible, for example, the user device 102A may simply provide an identifier of the requested media program to the content selector 308, then receive the media program from the media program provider. Or, the content selector could simply transmit the URL of the requested media program without use of an intermediary PID. Similar variants are also possible for the live streaming protocol embodiment discussed below.

Also, while the foregoing has been described with respect to the transfer of media program playback from a first user device 102A to a second user device 102B, the same principles can be used to resume playback in the same user device when transmission has been interrupted, for example, due to problems transmitting the media program wirelessly to the user devices 102.

Figure 5:
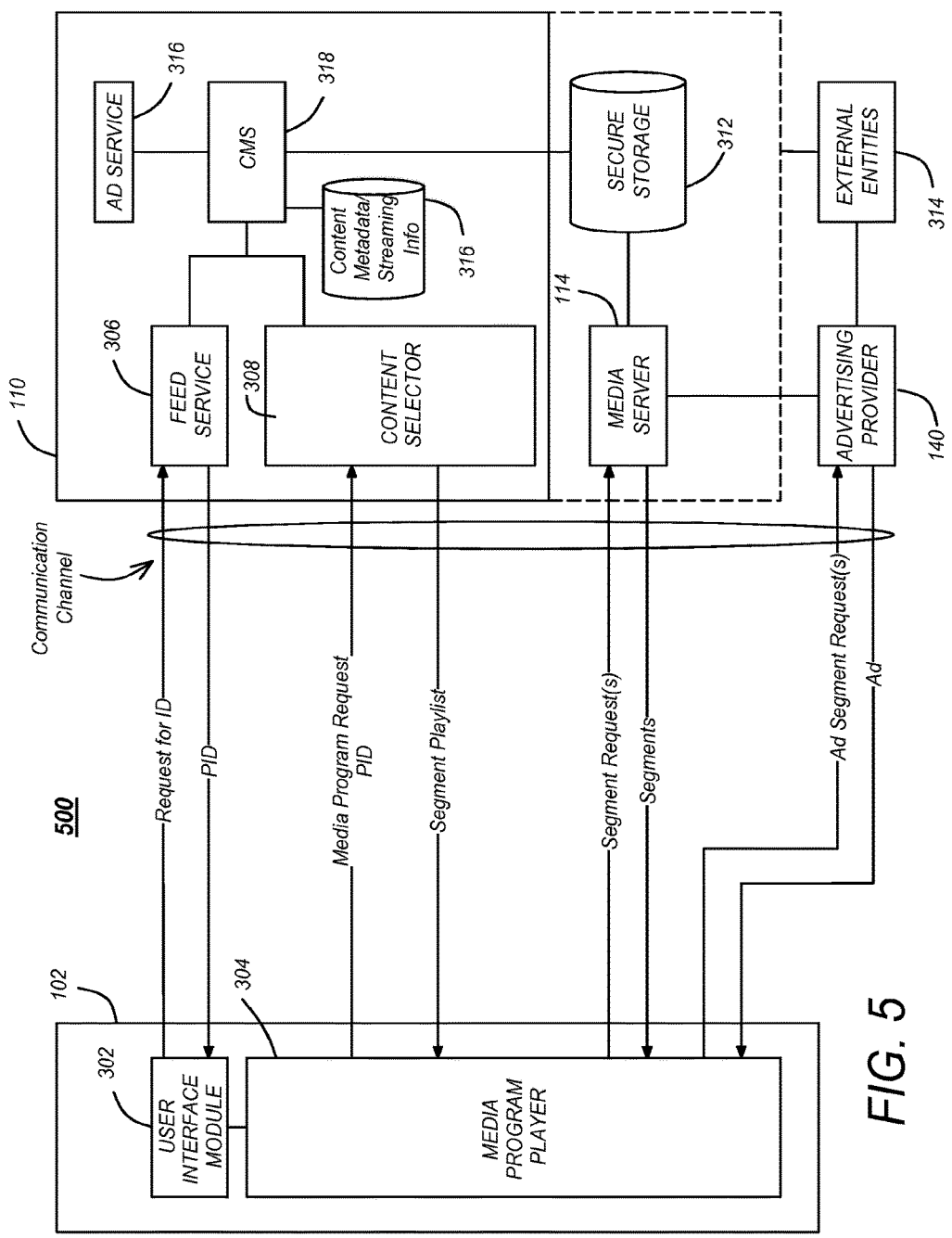
FIG. 5 is a diagram illustrating the transmission of media programs according to a live streaming protocol.

FIG. 5 is a diagram illustrating a system 500 that provides for the transmission of media programs according to a live streaming protocol. The live streaming protocol is especially useful for mobile and wireless devices. Fundamentally, the live streaming protocol is similar to the protocol illustrated in FIG. 3, except that the when the user device 102 requests the media program, it is provided with a "playlist" of small segments or "chunks" of the media program. The user device 102 uses the playlist to request transmission of each chunk of the media program in order, and when each chunk is received, it is processed and assembled into the media program presented to the user 132.

As shown in FIG. 5, the user device 102 transmits a request for the PID of the media program to the feed service 306. The request typically comprises a user ID or a proxy thereof, as well as some identification for the media program. The feed service 306 receives the request, and obtains the PID of the requested media program from the CMS 310, using information obtained from secure storage 312 and content metadata/streaming information database. The PID is then transmitted to the user device 102. The user device then transmits a media program request with the PID to the content selector 308.

In this embodiment, the media program is broken up into a plurality of segments or chunks that can be transmitted to the user device 102 upon request from the user device 102. Which segments to request and the order to request them is determined by a segment playlist that is transmitted from the media program provider 110 to the user device 102.

FIG. 6 is a diagram of an exemplary segment playlist 600. Items 602A-602D are calls to a particular URI to retrieve a particular video segment. "#EXTINF" is a tag that is a record marker that describes the media file identified by the URI that follows it. Each media file URI MUST be preceded by an EXTINF tag. The format of the #EXTINF tag is #EXTINF:<duration>,<title>. Call 604A is a four second "splash" that is shown before the media program begins. Calls 602B and 602C are for segments of media program having a PID of 50000011 ten seconds long, while call 602C is to a segment of the same media program that is eleven seconds long. The calls 602A-602D also may include a token for purposes authorization purposes. The EXT-X-DISCONTINUITY 604 tag indicates an encoding discontinuity between the media file that follows it and the one that preceded it. The set of characteristics that MAY change include (1) file format, (2) number and type of tracks, (3) encoding parameters, (4) encoding sequence and/or (5) timestamp sequence.

Figure 7A:
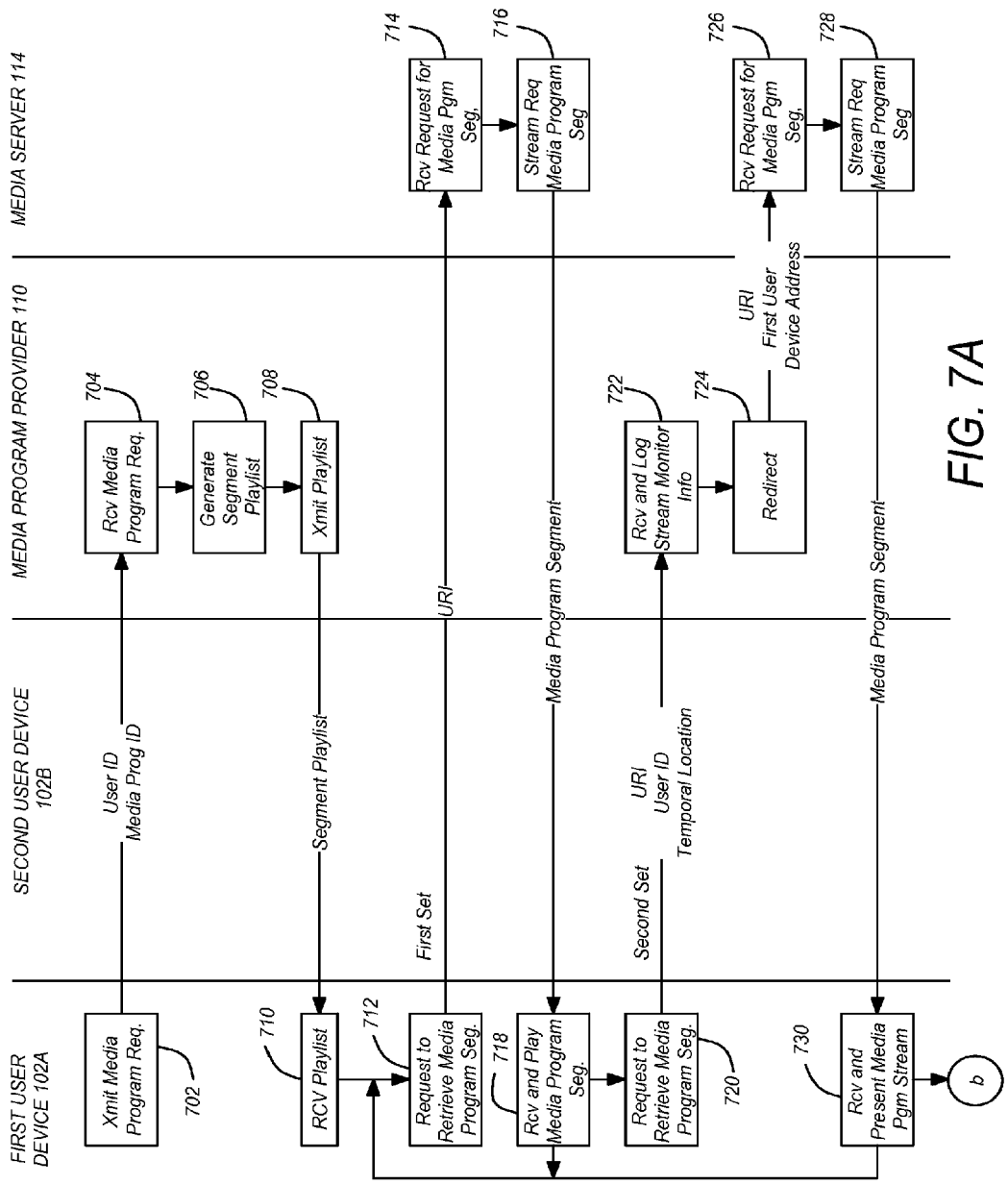
FIGS. 7A and 7B are diagrams illustrating an exemplary process for synchronizing a first user device and a second user device.
Figure 7B:
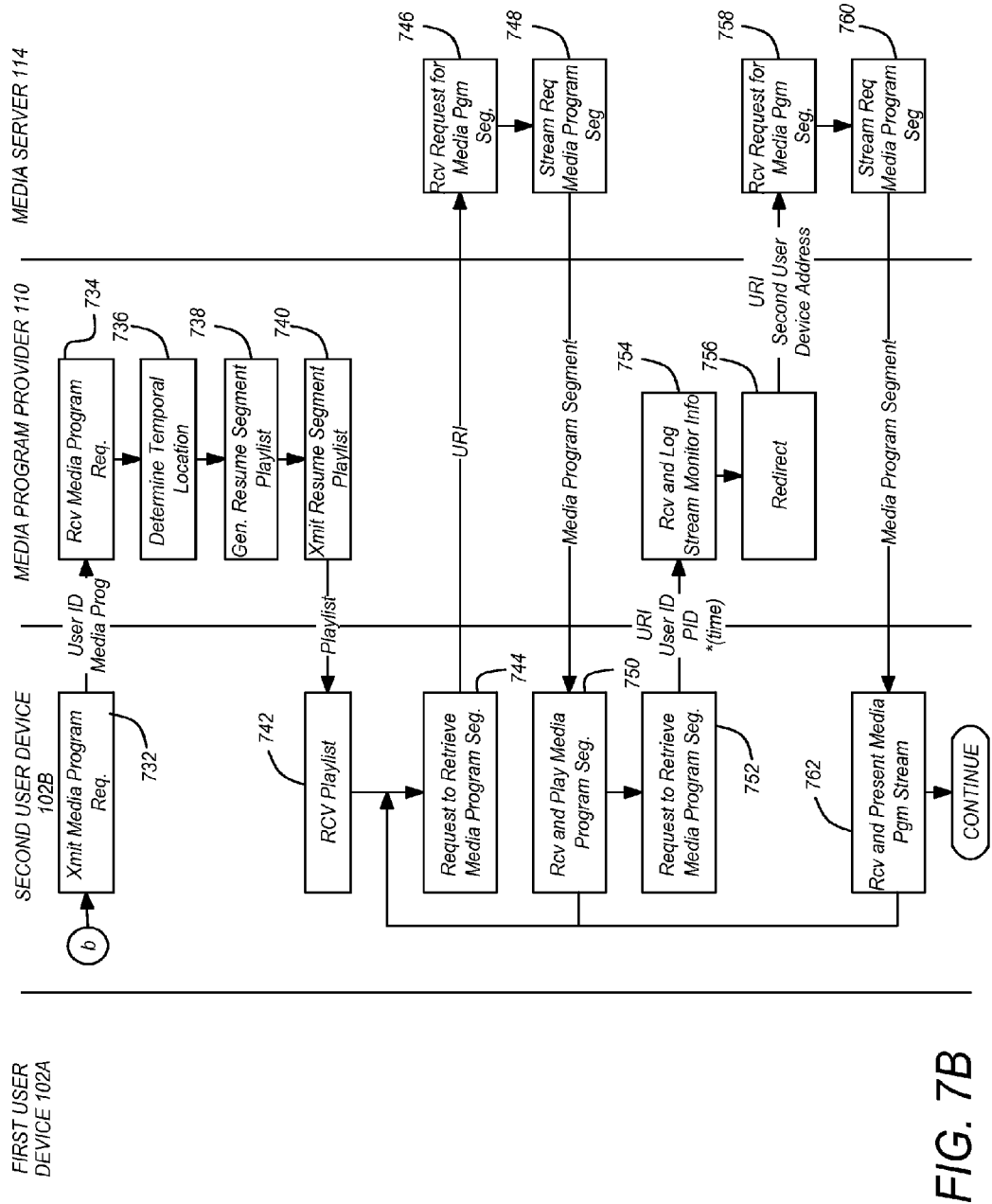

FIGS. 7A and 7B are diagrams illustrating an exemplary process for synchronizing a first user device 102A and a second user device 102B. This embodiment is particularly useful when the first user device 120A and the second user device 120B are devices using the live streaming protocol described in the Appendix of U.S. Provisional Patent Application No. 61/359,258, entitled "METHOD AND APPARATUS FOR SYNCHRONIZING PAUSED PLAYBACK ACROSS PLATFORMS," filed Jun. 28, 2010 by Robert M. Wong and Eden Li, which application is hereby incorporated by reference herein.

In block 702, a media program request is transmitted from the first user device 102A. In one embodiment, the media program request includes the user ID of the user 132 using the first user device, and a media program identifier such as the PID or other value. The media program provider 110 receives the request, as shown in block 704. The media program provider then generates a segment playlist, as shown in block 706. This segment playlist differs from the playlist shown in FIG. 7 as described below.

FIG. 8 is a diagram showing an exemplary playlist generated in block 706. Unlike the segment playlist illustrated in FIG. 6, this playlist separates the segments of the media program into two subsets. For the first subset of media program segments (those obtained by calls 802A-802J) are to be retrieved directly through the media server 114, while the second subset of media program segments (those obtained by calls 806A-806B) are calls back to the media program provider 110, which logs the call and redirects the call to the media server 114. In both cases, the first user device 102A will ultimately receive the media program segment of interest, but when using the second set of calls, the media program provider is informed of the requested segment, thus allowing the media program provider to divine the current status of the media program player running on the device that made the request. Since the segment request will return a media program segment that is in the order of 10 seconds long, and calls of the second set can be inserted into the playlist as often as desired, it is possible for the media program player 110 to thus be informed of the status of playback of the media program (including the temporal location within the media program and the resolution of the segment currently requested). Accordingly, the playlist 800 comprises instructions for receiving a first subset of the media program segments from the media server at a first set of uniform resource indicators (URIs) wherein each of the URIs are associated with one of the segments of the first subset of media program seconds. The playlist 800 also comprises instructions for receiving a second subset of media program segments from the media server via the media program provider at a second set of URIs, wherein each URI of the second set of URIs is associated with a segment of the second set of media program segments.

Using the information in the playlist 800, the media program player 110 can allow a second user device 120B to resume play from the same or nearly the same temporal position within the media program, and with the same streaming quality. This can be accomplished as described below.

In block 708, the segment playlist is transmitted from the media program provider 110 to the first user device 102A, as shown in block 708. The first user device 102A receives the playlist 710 and transmits a request to retrieve one of the first set of media program segments, as shown in block 712. In one embodiment, the request is in the form shown in FIG. 8, which includes a tag and a URI, and in which the URI includes a media program ID and a token. A user ID may also be included, but is not necessary.

The media server 114 receives the request and transmits or streams the media program segment to the first user device 102A, as shown in blocks 714 and 716. The first user device 102A receives the requested media program segment and plays the segment, as shown in block 718. The first user device 102A may also buffer the received media program segment if necessary. The first user device then requests the next media program segment in the playlist. If the next call is a member of the first set (that is, the playlist indicates that the media program segment is to be retrieved directly from the media server 114), professing returns to block 712, and another request to receive another segment of the media program is transmitted from the first user device 102A to the media server 114. For example, using playlist 800, calls 802B-802D will cause the first user device 102A to request segments 0, 1 and 2 of the media program having the PID of 50000011 from the media server 114.

In block 720, the first user device requests a media program segment from the second subset of segments. This would occur when the first user device encounters a call (such as call 806A) to the media program provider 110. The call includes the URI to call the media program provider, the user ID (in the illustrated embodiment "A2301AF", and may also optionally include the temporal location of the current playback of the media program. The media program provider 110 receives the call and stores or logs the call for later use, as shown in block 722. The request is then redirected to the media server using the URI in the call, as shown in block 724. The media server 114 receives the redirected call and transmits the media program segment that was the subject of the call to the second user device 102B, as shown in blocks 726 and 728. The second user device 102B receives the media segment and plays the segment, thus presenting the segment to the user 132, as shown in block 730. The foregoing process continues until the media program has ended or until a request to receive the same media program is received in the media program provider 110 from a second user device 102B, as shown in block 732.

As was described above with respect to the embodiment illustrated in FIGS. 4A and 4B, the request for the media program from the second user device 102B can include an indication that the request is a request to resume playback of the media program on a different device from the same temporal position in the media program, or that information can be inferred from the request itself (a request for the same media program having the same user ID that comes from another device allows such an inference, but other information may also be used). In the illustrated embodiment, the request includes a user ID and a media program identifier such as the PID.

The media program request is received in the media program provider 110, as shown in block 734. In block 736, the state of the playback of the media program before the resume request is determined. This can include, for example, a determination of the temporal location of the media program when playback by the first user device 102A was ceased. Since the embodiment shown in FIGS. 7A and 7B depict a protocol wherein small chunks of the media program are transmitted to the user devices 102 in segments, a reasonable determination of what the temporal playback position of the media program can be the temporal location of the last segment known by the media program provider 110 to have been transmitted. That would be, for example, the last call for one of the media program segments in the second set. Since the media program segment may have been transmitted, but not received, the temporal playback position could instead be determined as the call before the last call for one of the media program segments in the second set. In practice, it may be desirable to determine the temporal position of the suspended playback or to at least resume such playback before the actual temporal location where playback was suspended, as this allows the viewer to resume viewing the media program with some context regarding scenes. Since the media program provider 110 also has knowledge regarding the scenes of the media program, the media program provider may determine the temporal position for purposes of resuming playback to be at the beginning of the scene where playback was suspended, or perhaps the scene before that. This could be implemented by generating a playlist such that every scene change results in a call to a media program segment that is a member of the second set, as this will assure that the media program provider will be informed of playback progress for each scene. Alternatively, the media program provider 110 may generate the playlist so that calls to one of the second set of segments are made periodically (e.g. every minute).

In blocks 738, the media program provider 110 generates a resume playlist which includes calls to the media program segments beginning with the desired segment (determined from the temporal location described above). That playlist also includes segments that are members of the first or the second list, to permit transfer of playback of the media program back to the first user device 102A or to a third device. Accordingly, the resume playback list would look similar to the resume playback list 800, except it would not include calls to those media program segments which are known to have already been received by the user device 102 and displayed.

The first user device 102A receives the resume playlist and makes the calls described in the resume playlist in a manner analogous to that which is described above. This is shown in blocks 744-762. Thus, calls to retrieve members of the first subset of media program segments directly from the media server 144 are made, and calls to retrieve members of the second subset of media program segments are made to the media program provider 110, which are logged and/or stored, and redirected to the media server 114. As described above, this allows the media program provider to determine the playback state of the media program on the second user device, while still allowing the media server 114 to transmit the media program segments to the second user device 102B.

The foregoing has described methods by which play of a media program on one user device 102A may be resumed on a second user device 102B. It is possible, and even desirable that the first user device 102A and the second user device 102B will operate under different protocols. For example, the first user device 102A could be a computer running a desktop application operating under the protocol described in FIG. 3, while the second device is a mobile device operating under the protocol described in FIG. 5. Or, the first user device 102A could be a mobile device operating under the protocol described in FIG. 5, and the second user device 102B could be a computer running a desktop application and operating under the protocol described in FIG. 3

In either case, the principles described above can be used to synchronize playback, even between devices operating with different protocols.

FIG. 9A is a diagram illustrating exemplary process steps that would allow a media program being played by a user device 102A operating under the segmented protocol shown in FIG. 5 to be resumed by a user device 102B operating under the streaming protocol illustrated in FIG. 3. In this embodiment, when the media program resume request is transmitted by the second user device 102B to the media program provider, information may also included that allows the media program provider to determine which protocol the second user device is operating under, or the request itself may inherently comprise this information. The media program provider 110 can use this information to determine the temporal location that will be used to resume play, and processing will pass to block 436 of FIG. 4B. In other words, a PID, the temporal location, and other information will be transmitted to the second user device 102B instead of the resume playlist that would have been transmitted if the second user device 102B were compliant with the live streaming protocol.

FIG. 9B is a diagram illustrating exemplary process steps that would allow a media program being played by a user device 102A operating under the streaming protocol shown in FIG. 5 to be resumed by a user device 102B operating under the segmented protocol illustrated in FIG. 3. In this embodiment as well, when the media program resume request is transmitted by the second user device 102B to the media program provider, information may also included that allows the media program provider to determine which protocol the second user device is operating under, or the request itself may inherently comprise this information. The media program provider 110 can use this information to determine the temporal location that will be used to resume play, and processing will pass to block 738 of FIG. 7B. However, as shown in FIG. 7B, in this case, the information provided to the second user device 102B is a playlist generated so that the first media program segment identified in the playlist and therefore played, is one that either is at the determined temporal location within the media program where playback was interrupted, or before that temporal location.

Other embodiments are also envisioned. For example, first user device may transmit media program playback state information to the media program provider 110 or media server 114 after relevant playback events (e.g. pause or stop, or trick play commands). The playback state information can include the identity of the media program being played, the location (time or frame) within the media program that the change took place, the playback event, and any other additional information. Thus, when the media program provider 110 receives the a request associated with the same user identifier from a different device (determined, for example, by a different device identifier), the media program provider 110 uses the media program playback state information to determine where playback should begin anew with the new device or original device, and the appropriate portion(s) of the media program are transmitted. Media program playback state can also be transmitted before shutdown of the first user device 102A or the media program player executing on the device 102A, including undesired shutdowns and terminations. Further, instead of or addition to the transmission of the media program playback state upon a playback event, the first user device 102A may send periodic or aperiodic messages to the media program provider 110 or media server 114 to inform the media program provider 110 or media server of the media program playback state, independent of any playback event.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of resuming playback of a media program, the playback initiated by a first device and resumed on a second device, the method comprising:

receiving, by a media server, a first request to transmit the media program to the first device;

streaming, by the media server, the media program to the first device;

during the streaming, monitoring, by the media server, an event from the streaming of the media program to the first device to generate media program streaming information;

during the streaming, transmitting, by the media server, the media program streaming information to a media program provider including the event before the media program is one or more of stopped and paused on the first device;

receiving, by the media server, a second request to resume transmission of the media program from a second device, wherein the request includes a playback temporal location within the media program that was inferred based on the event included in the media program streaming information, and wherein the event did not include the playback temporal location; and resuming, by the media server, transmission of the media program to the second device from the temporal location received from the media program provider.

2. The method of claim 1, further comprising:

receiving a monitoring application from the media program provider, the monitoring application configured to generate the media program streaming information.

3. The method of claim 1, wherein:

the media program streaming information provides information regarding a playback state of the first device.

4. The method of claim 3, wherein:

the playback state is used to determine a current temporal position based on when streaming was one or more of stopped and paused on the first device, and the current temporal position being different from the playback temporal position.

5. The method of claim 1, wherein the media server is a flash server.

6. A method for resuming playback of a media program, the playback initiated by a first device and resumed on a second device, comprising:

receiving, from the first device, a first request to initiate transmission of a media program from a media server to the first device;

transmitting a media program identifier to the first device, the media program identifier identifying the media program to be streamed by the media server to the first device;

receiving media program streaming information from the media server before the media program is one or more of stopped and paused on the first device, the media program streaming information generated from monitored streaming of the media program from the media server to the first device and including an event from the streaming of the media program;

receiving, from the second device, a second request to resume transmission of the media program from the media server to the second device;

inferring a temporal location within the media program from which to resume transmission of the media program at least in part from the event in the media program streaming information received from the media server, wherein the event did not include the temporal location; and transmitting a media program identifier and information describing the temporal location to the second device.

7. The method of claim 6, wherein:
the media program streaming information provides information regarding a playback state of the first device.

8. The method of claim 7, wherein:
the playback state comprises a current temporal position based on when the streaming of the media program was one or more of stopped and paused on the first device, and
the current temporal position being different from the playback temporal position.

9. The method of claim 6, wherein inferring the temporal location comprises:
using a buffer size of the first device to determine the temporal location that is different from a current temporal position when the streaming of the media program was one or more of stopped and paused on the first device.

10. The method of claim 6, wherein determining the temporal location comprises:
using a transmission channel bandwidth between the media server and the first device to determine the playback temporal location that is different from a current temporal position when the streaming of the media program was one or more of stopped and paused on the first device.

11. The method of claim 6, wherein determining the temporal location comprises:
using media program metadata to determine the current temporal location such that playback of the media program on the second device begins at a beginning of a scene, wherein the playback temporal position is different from a current temporal position when the streaming of the media program was one or more of stopped and paused on the first device.

12. A non-transitory computer-readable storage medium containing instructions for resuming playback of a media program, the playback initiated by a first device and resumed on a second device, the instructions, when executed, control a media server to be configured for:
receiving, by a media server, a first request to transmit the media program to the first device;
streaming, by the media server, the media program to the first device;
during the streaming, monitoring, by the media server, an event from the streaming of the media program to the first device to generate media program streaming information;
during the streaming, transmitting, by the media server, the media program streaming information to a media program provider including the event before the media program is one or more of stopped and paused on the first device;
receiving, by the media server, a second request to resume transmission of the media program from a second device, wherein the request includes a temporal location within the media program that was inferred based on the event included in the media program streaming information, and wherein the event did not include the temporal location; and
resuming, by the media server, transmission of the media program to the second device from the temporal location received from the media program provider.

13. The non-transitory computer-readable storage medium of claim 12, further comprising:
receiving a monitoring application from the media program provider, the monitoring application configured to generate the media program streaming information.

14. The non-transitory computer-readable storage medium of claim 12, wherein:
the media program streaming information provides information regarding a playback state of the first device.

15. The non-transitory computer-readable storage medium of claim 14, wherein:
the playback state is used to determine a current temporal position based on when streaming was one or more of stopped and paused on the first device, and
the current temporal position being different from the playback temporal position.

16. A non-transitory computer-readable storage medium containing instructions for resuming playback of a media program, the playback initiated by a first device and resumed on a second device, the instructions, when executed, control a computer system to be configured for:
receiving, from the first device, a first request to initiate transmission of a media program from a media server to the first device;
transmitting a media program identifier to the first device, the media program identifier identifying the media program to be streamed by the media server to the first device;
receiving media program streaming information from the media server before the media program is one or more of stopped and paused on the first device, the media program streaming information generated from monitored streaming of the media program from the media server to the first device and including an event from the streaming of the media program;
receiving, from the second device, a second request to resume transmission of the media program from the media server to the second device;
inferring a temporal location within the media program from which to resume transmission of the media program at least in part from the event in the media program streaming information received from the media server, wherein the event did not include the temporal location; and
transmitting a media program identifier and information describing the temporal location to the second device.

17. The non-transitory computer-readable storage medium of claim 15, wherein:
the media program streaming information provides information regarding a playback state of the first device.

18. The non-transitory computer-readable storage medium of claim 16, wherein:
the playback state comprises a current temporal position based on when the streaming of the media program was one or more stopped and paused on the first device, and
the current temporal position being different from the playback temporal position.

19. The non-transitory computer-readable storage medium of claim 15, wherein determining the temporal location comprises:
using a buffer size of the first device to determine the temporal location that is different from a current temporal position when the streaming of the media program was one or more of stopped and paused on the first device.

20. The non-transitory computer-readable storage medium of claim 15, wherein determining the temporal location comprises:
using a transmission channel bandwidth between the media server and the first device to determine the playback temporal location that is different from a current temporal position when the streaming of the media program was more of stopped and paused on the first device.

21. The non-transitory computer-readable storage medium of claim 15, wherein determining the temporal location comprises:

using media program metadata to determine the current temporal location such that playback of the media program on the second device begins at a beginning of a scene, wherein the playback temporal position is different from a current temporal position when the streaming of the media program was one or more of stopped and paused on the first device.

22. The method of claim 1, wherein the playback temporal location within the media program is inferred based on a buffer size of the first device to adjust a current temporal position in which the streaming of the media program was one or more of stopped and paused.

23. The method of claim 1, wherein the playback temporal location within the media program is inferred based on a transmission bandwidth between the media server and the first device to adjust a current temporal position in which the streaming of the media program was one or more of stopped and paused.

24. The method of claim 1, wherein the playback temporal location within the media program is inferred by adjusting a current temporal position in which the streaming of the media program was one or more of stopped and paused using metadata for the media program.

25. The method of claim 1, wherein the playback temporal location within the media program is inferred by calculating a time period that has elapsed after the event.

26. The method of claim 1, further comprising:

transmitting media program streaming information to the media program provider periodically during the streaming.

* * * * *